United States Patent [19]
Kato

[11] Patent Number: 5,539,533
[45] Date of Patent: Jul. 23, 1996

[54] FACSIMILE MACHINE

[75] Inventor: Tokunori Kato, Ichinomiya, Japan

[73] Assignee: Brother Kogyo Kabushiki Kaisha, Nagoya, Japan

[21] Appl. No.: 228,718

[22] Filed: Apr. 18, 1994

[30] Foreign Application Priority Data

May 28, 1993 [JP] Japan ................................. 5-151185

[51] Int. Cl.$^6$ ........................... H04N 1/393; H04N 1/40; G06K 9/42
[52] U.S. Cl. ........................ 358/451; 358/447; 358/448; 382/299
[58] Field of Search ....................... 358/400, 401, 358/440, 448, 449, 451, 447, 406, 445, 451, 447, 504, 509, 512, 535, 482, 299, 300, 428; 382/47, 298, 299, 300

[56] References Cited

U.S. PATENT DOCUMENTS

| | | | |
|---|---|---|---|
| 4,503,469 | 3/1985 | Kato | 358/287 |
| 4,644,409 | 2/1987 | Fuchs | 358/256 |
| 5,121,222 | 6/1992 | Endoh | 358/451 |
| 5,189,529 | 2/1993 | Ishiwata | 358/451 |
| 5,241,403 | 8/1933 | Ishikawa | 358/440 |
| 5,305,117 | 4/1994 | Oshita | 358/451 |

Primary Examiner—Sandra L. O'Shea
Assistant Examiner—John Ning
Attorney, Agent, or Firm—Oliff & Berridge

[57] ABSTRACT

In a facsimile machine, when a received image data having resolution of standard mode is stored in a reception data memory, the image data is decoded and then converted to image data of two fine or four super fine lines and stored in a first recording data memory. The image data stored in the first recording data memory is subjected to a thin-out processing at a set reduction ratio, then stored in a second recording data memory and finally recorded on a recording sheet.

22 Claims, 6 Drawing Sheets

FACSIMILE MACHINE

BACKGROUND OF THE INVENTION

1. Field of the Invention

This invention relates to a facsimile machine, and particularly to a facsimile machine capable of conducting a reduction processing of received image data or image data read out to conduct a copying operation.

2. Description of Related Art

In general, facsimile machines have been widely used, and their wide use has led to the facsimile machines having high functions. For example, the facsimile machine has not only a function of transmitting and receiving image data of an original in a standard mode which corresponds to a low resolution, but also a function of transmitting image data in a fine or super fine mode which correspond to higher resolution. Further, facsimile machines which are provided with a copying function and a reducing function have been practically used.

In this kind of facsimile machine, when received image data whose resolution corresponds to any one of the standard mode, the fine mode or the super fine mode are reduced, for example, using a reduction ratio of 80% to record reduced image data on a recording sheet, the received image data are stored in a reception memory, and a number of line data constituting the image data are first subjected to a thin-out processing for thinning out the image data of one line in an auxiliary scanning direction. The reduced image data which has been subjected to the thin-out processing are also subjected to a thin-out processing for thinning out dot data in a main scanning direction. The reduced image data which have been subjected to the thin-out processing in the auxiliary and main scanning directions as described above are prepared as recording data at the designated resolution and the recording data are recorded on the recording sheet.

As described above, in the conventional facsimile machine which is provided with the copying function and the reducing function and can transmit and receive image data of an original at a plurality of resolutions, for a recording operation under data reduction, a number of received one-line image data are subjected to thin-out processing in accordance with a reduction ratio in the auxiliary and main scanning directions line by line to finally prepare recording data and record it on a recording sheet. Particularly for a reducing operation of standard-pitch image data which corresponds to a low resolution, the weight of the one-line image data to the whole image data is increased and, thus, the plural one-line image data are required to be thinned out in the auxiliary scanning direction in accordance with the reduction ratio. Therefore, there is a problem that image quality of the recorded image is deteriorated and moire occurs.

SUMMARY OF THE INVENTION

An object of the invention is to provide a facsimile machine in which reduced image data is prepared on the basis of received image data or image data read out for a copying operation with improving image quality of the recorded image.

In order to attain the above object, the facsimile machine according to the invention includes reception means for receiving image data transmitted from an external source, read-out means for reading an original, storage means for storing image data supplied from the reception means or the read-out means and record means for recording image data on a recording sheet at an indicated resolution, further comprises a reduction ratio setting means for setting a reduction ratio at which the image data stored in the recording means is recorded on the recording sheet, and reduced image data preparing means for converting the image data read out from the storage means to high-density image data which has a higher resolution in the auxiliary scanning direction than an indicated resolution and conducting a thin-out processing in the auxiliary scanning direction on the high-density image data on the basis of the reduction ratio set by the reduction ratio setting means to prepare reduced image data.

In the facsimile machine thus structured, the image data which is received by the reception means or supplied from the read-out means are stored in the storage means. The reduced image data preparing means reads out the image data from the storage means to convert it to high-density image data which has a higher resolution in the auxiliary scanning direction than the indicated resolution, that is, to image data whose line data number is larger than that of the received image data, and conducts this high-density image data to the thin-out processing in the auxiliary scanning direction on the basis of the reduction ratio set by the reduction ratio setting means to thereby prepare the reduced image data. Thereafter, the reduced image data thus prepared are subjected to the thin-out processing in the main scanning direction, and then the recording image data reduced in the auxiliary and main scanning directions are finally recorded on the recording sheet.

As described above, the image data read out from the storage means are converted to the high-density image data which has higher resolution in the auxiliary scanning direction than the indicated resolution, that is, to the image data whose line data number is larger than that of the received image data, and then subjected to the thin-out processing based on the reduction ratio in the auxiliary scanning direction. Therefore, the line data number to be thinned out becomes larger, the weight (rate) of the one-line image data to the whole image data is reduced, and the thinned-out one-line data are dispersed in the auxiliary scanning direction so that the reduced image data can be prepared to improve the image quality of the recorded image.

BRIEF DESCRIPTION OF THE DRAWINGS

The invention will be described with reference to the accompanying drawings, in which.

DETAILED DESCRIPTION OF THE PREFERRED EMBODIMENT

The embodiment relates to a case where the invention is applied to a facsimile machine which is capable of recording received image data of an original on a recording sheet and has a copying function.

The structure of the facsimile machine will be briefly described with reference to FIGS. 1 and 2.

Figure 1:
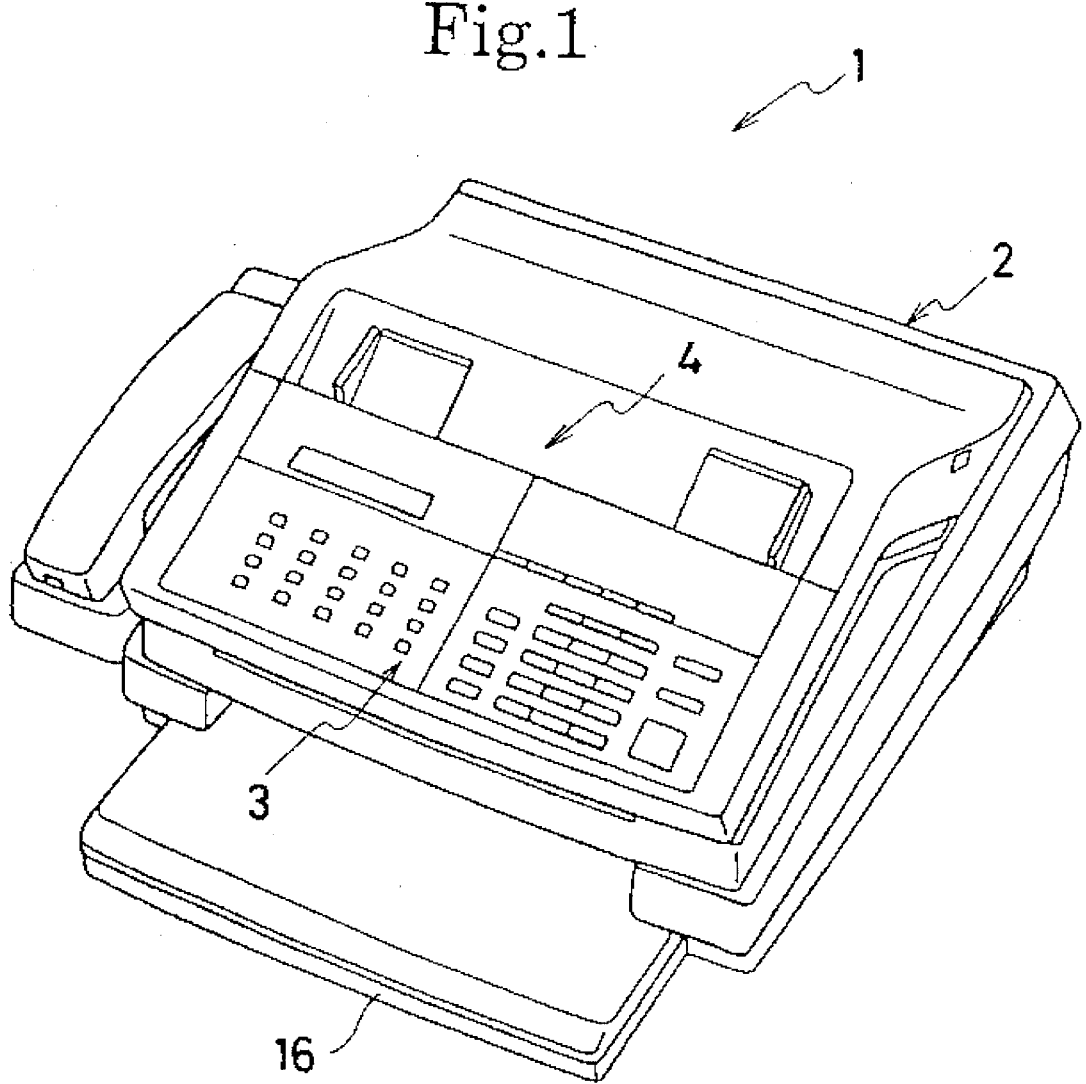
FIG. 1 is a perspective view of a facsimile machine according to an embodiment of the invention.
Figure 2:
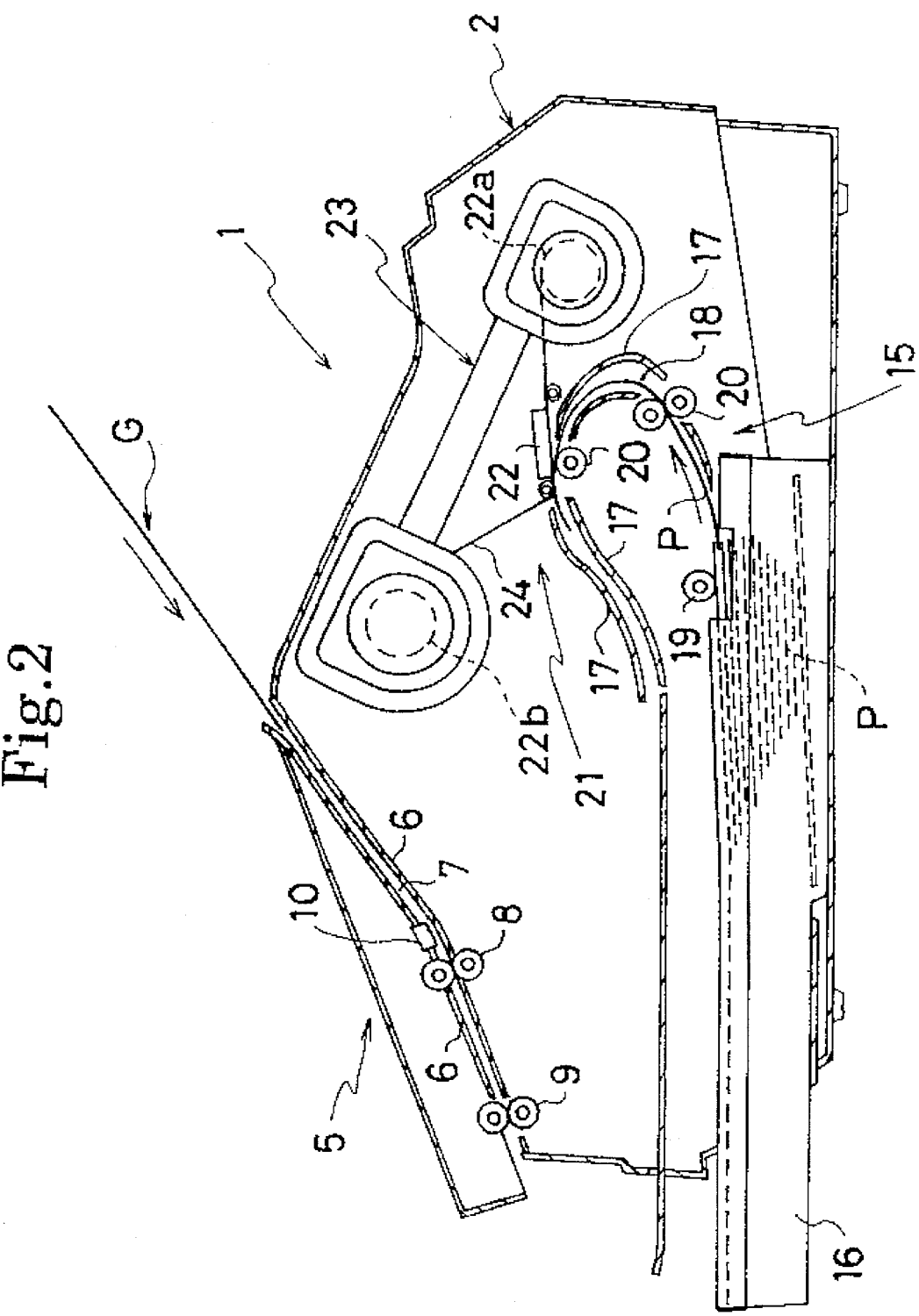
FIG. 2 is a longitudinal-sectional view of a main part of the inner structure of the facsimile machine.

As shown in FIG. 1, an operation panel 3 is provided at the front side of the upper portion of a main frame 2 of the facsimile machine 1. The operation panel 3 is provided with a plurality of function keys, for executing transmission processing of original data and of copying processing, such as a transmission key, a copying key, a reduction ratio setting key, and ten keys. Further, an original mount portion 4 is provided just behind the operation panel 3. On the original mount portion 4 can be mounted plural originals G which comprise plural kinds of cut sheets, such as A-4 size sheets and B-5 size sheets.

Next, a read-out device 5 for reading out an original G set on the original mount portion 4 will be described with reference to FIG. 2.

A first sheet passage 7 for guiding an original G, set on the original mount portion 4, through the main frame is formed by plural guide walls 6 inside of the main frame 2 and just below the operation panel 3. A pair of sheet supply rollers 8 for supplying the original G is disposed at the middle portion of the first sheet passage 7. Further, a pair of sheet discharge rollers 9 for discharging the original G out of the main frame are disposed at the end portion of the downstream side of the first sheet passage 7. These sheet supply rollers 8 and the sheet discharge rollers 9 are rotationally driven in a sheet feeding direction in synchronism with an original feeding motor 35 (see FIG. 3).

A read-out sensor 10 for reading the original G fed by the sheet supply rollers 8 and a light-emitting diode (LED) 11, serving as a light source for the reading (see FIG. 3), are disposed just at the upstream side of the sheet supply rollers 8 to confront the first sheet passage 7. The read-out sensor 10 comprises a CCD line image sensor and is so designed as to store charges through reflected light from the light-emitting diode 11 to read image data of one line of the original G.

Next, a recording device 21, provided inside of the main frame 2 and serving to store on a recording sheet P image data of an original G received from the external source or read by the read-out device 5 for copying, and a sheet feed device 15 for feeding the recording sheet P will be described with reference to FIG. 2.

A sheet cassette 16 for stocking a plurality of recording sheets P, formed of cut sheets such as A-4 size sheets, B-5 sheets or the like, is detachably mounted at the lower end portion of the inside of the main frame 2. A second guide passage 18 is formed by a plurality of guide walls 17 so as to extend from the rear end portion of the sheet cassette 16 in U-shaped form. A sheet supply roller 19 is disposed at the starting portion of the second guide passage 18 and a plurality of sheet feed rollers 20 and a thermal head 22, comprising a large number of (for example 1728) heating elements which are arranged on a row at a predetermined length, are provided midway in the second guide passage 18 so as to confront the second guide passage 18. In the embodiment the length of the row on which the heating elements are arranged is the same as that of the largest recording sheet in the direction perpendicular to the recording sheet feeding direction. The sheet supply roller 19 and the sheet feed rollers 20 are rotationally driven in synchronism with the recording sheet feeding motor 37 (see FIG. 3).

In addition, a ribbon cassette 23, for accommodating an ink ribbon 24 whose width corresponds to the width of the thermal head 22, is provided at the upper side of the second guide passage 18. The ink ribbon 24 is wound around a ribbon supply spool 22a which is rotatably supported on the ribbon cassette 23, passed by the thermal head 22 and taken up by a ribbon take-out spool 22b.

Upon the start of the recording operation, an uppermost recording sheet P of the sheets P stocked in the sheet cassette 16 is supplied to the second guide passage 18 by the sheet supply roller 19. The recording sheet P is subjected to a recording operation with ink of the ink ribbon 24 through a heating operation of the thermal head 22 while being fed along the second guide passage 18 at a predetermined speed. Thereafter, the recording sheet P, thus recorded, is discharged through the second guide passage 18 to the outside of the main frame. The thermal head 22 and the ribbon cassette 23 constitute the recording device 21.

Figure 3:
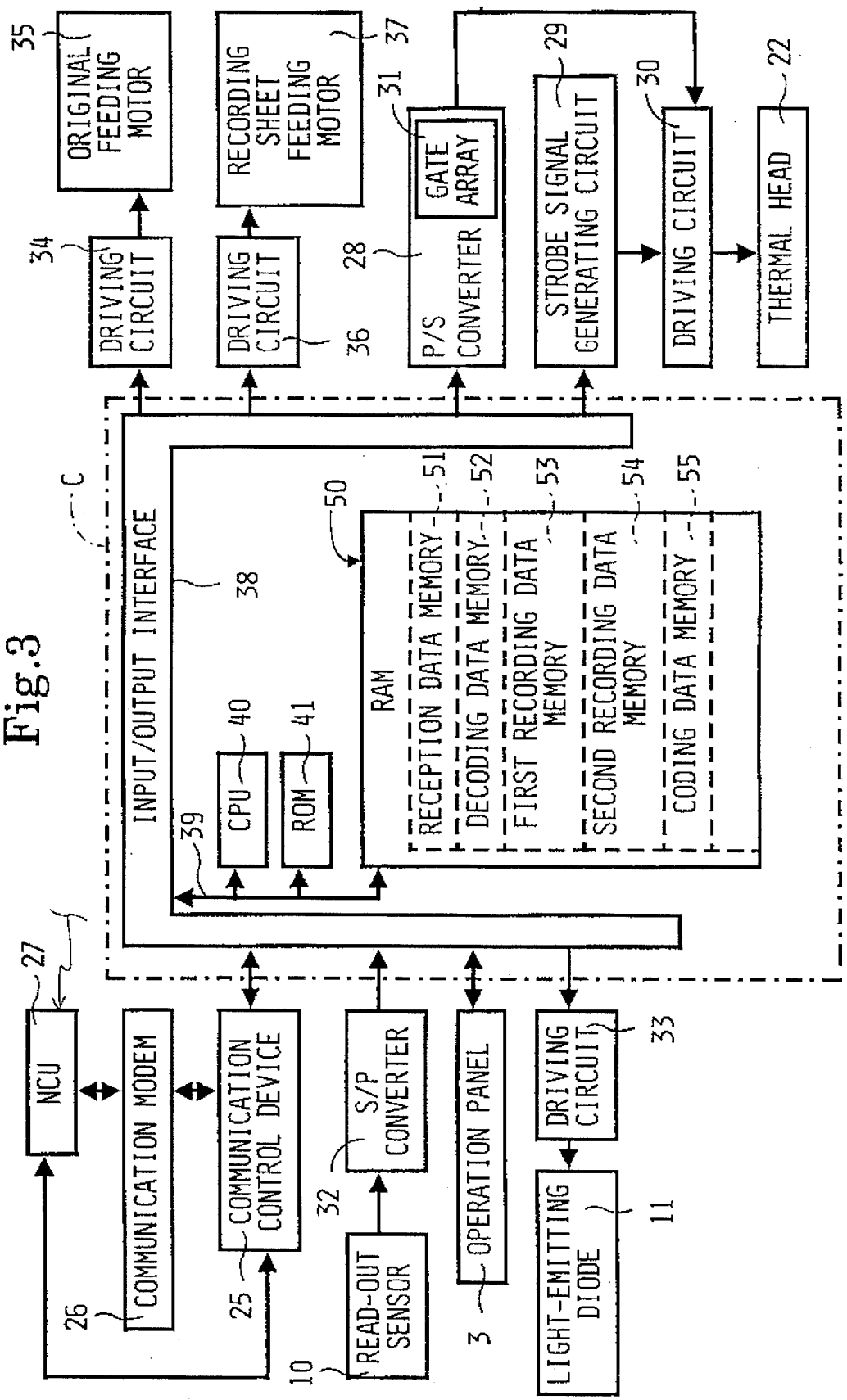
FIG. 3 is a block diagram showing a control system for the facsimile machine.

Next, the control system for the facsimile machine will be described with reference to the block diagram of FIG. 3.

A communication control device 25 is connected to an input/output interface 38 of a control device C and to a communication modem 26 and a net control unit (NCU) 27. The communication control device 25 executes facsimile control when control signals or image data received from the input/output interface 38 are transmitted to the communication modem 26 or when control signals or image data received from the communication modem 26 are transmitted to the input/output interface 38. The communication modem 26 executes modulation control of image data to transmission signals at a transmission time and also executes demodulation control of received transmission signals to image data at a reception time. The net control unit 27 automatically executes transmission control for a transmitter and automatically executes reception control for reception of a transmission from the external source.

A driving circuit 30 for driving the thermal head 22 is connected to a strobe signal generating circuit 29 and a P/S (parallel/serial) converter 28. The parallel image data which are output from the input/output interface 38 are converted to serial image data in the P/S converter 28 and supplied to the drive circuit 30. In response to a strobe signal received from the strobe signal generating circuit 29, the driving circuit 30 outputs a drive signal to the thermal head 22. The P/S converter 28 is provided with a gate array 31.

Further, the input/output interface 38 of the control device C is connected to the communication control device 25, a S/P converter 32 for converting serial image data output from the read-out sensor 10 into parallel image data, the operation panel 3, a driving circuit 33 for the light-emitting diode 11, a driving circuit 34 for the original feeding motor 35, a driving circuit 36 for the recording sheet feeding motor 37, the P/S converter 28 and the strobe signal generating circuit 29.

The control device C comprises a CPU 40, the input/output interface 38 connected through a bus 39, such as a data bus, to the CPU 40, a ROM 41 and a RAM 50.

The ROM 41 stores a coding control program for preparing transmission signals which are obtained by compressing (coding) the image data of the original G at the transmission time, a decoding control program for expanding (decoding) the coded transmission signals to the image signal at the reception time, a control program for controlling reduced image data preparation which is characteristic of this application and described later, and various kinds of control programs for facsimile communication control and copying control.

A reception data memory 51 of the RAM 50 is provided with a predetermined memory capacity (for example, 256

Kbytes), and the received transmission signals, that is, the coded image data are successively stored. In the decoding data memory 52 are stored the image data obtained by decoding the transmission signal received from the reception data memory 51 and the image data read out by the read-out sensor 10 for a copying operation. The first recording data memory 53 has stored therein high-density image data of high resolution to which the image data of the decoding data memory 52 is converted in a super fine mode. The second recording data memory 54 is stored with reduced image data which is obtained by thinning out the high-density image data of the first recording data memory 53 on the basis of the reduction ratio. The coding data memory 55 is stored with image data which is coded at the transmission time. Further, the RAM 50 is provided with a work memory for storing data on a reduction ratio set for the recording operation on the recording sheet P, a pointer value, and various kinds of memories for temporarily storing a calculation result of the CPU 4.

In the facsimile machine 1 as described above, all image data which are transmitted at resolutions corresponding to the super fine mode, the fine mode and the standard mode can be received and recorded. Here, assuming 1/15.4 mm (400 dots/inch) is one super fine line, the super fine mode is defined as a mode for reading out an original G at a resolution corresponding to every one super fine line (400 dots/inch). The fine mode is also defined as a mode for reading out the original G at a resolution corresponding to every two super fine lines, and the standard mode is defined as a mode for reading out the original G at a resolution corresponding to every four super fine lines.

Image data which are received at the resolution of the super fine mode are respectively successively recorded on the recording sheet P every time the recording sheet P is fed by a super fine pitch (about 65 μm). Image data which are received at the resolution of the fine mode are respectively recorded by an amount of the same two super fine lines, and these equivalents of two super fine image data are successively recorded every time the recording sheet P is fed by the super fine pitch for two feedings. Further, image data which are received at the resolution of the standard mode are respectively recorded by an amount of four super fine lines, and these equivalents of the same four super fine image data are successively recorded every time the recording sheet P is fed by the super fine pitch for four feedings.

Next, the routine for reduced image data preparation control, which is executed in the control device C of the facsimile machine 1, will be described with reference to a flowchart of FIG. 4. In the description, the following assumption is made. That is, at the start time of the control, the received image data of standard mode resolution are stored in the reception data memory 51 and then decoded, so that the image data comprising plural line data of a first line data (hereinafter referred to as "A line image data"), a second line data (hereinafter referred to as "B line image data"), a third line data (hereinafter referred to as "C line image data"), a fourth line data (hereinafter referred to as "D line image data"), a fifth line data (hereinafter referred to as "E line image data"), . . . are stored in the decoding data memory 52. Further, with respect to each line data, the data of one byte at the head thereof is represented. The character Si (i=11, 12, 13, . . . ) in the figures represents each step.

Control is started when the image data is stored into the decoding data memory 52. First, reduction ratio data is read in from the work memory of the RAM 50 and the reduction ratio (a/b) is used to set variables a and b respectively (S11).

Figure 5:
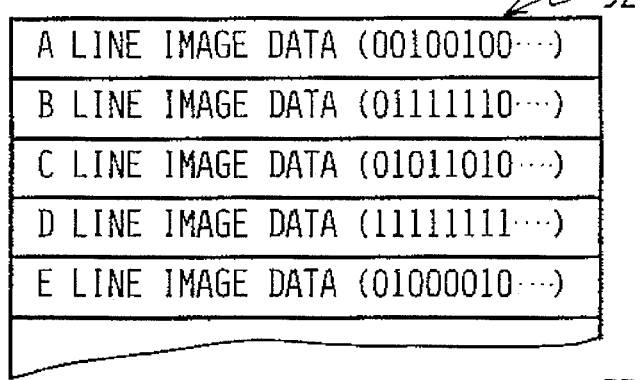
FIG. 5 is a schematic view of image data stored in a decoding data memory.
Figure 6:
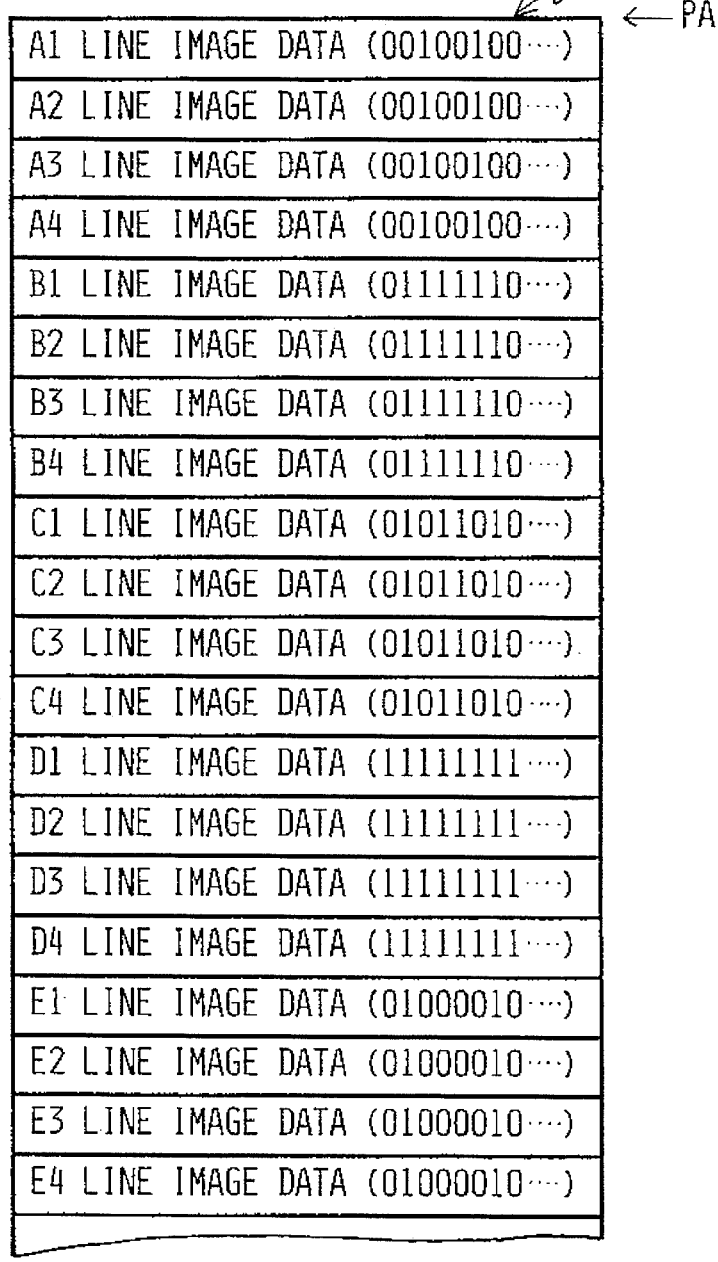
FIG. 6 is a schematic view of high-density image data stored in a first recording data memory.

With respect to the image data stored in the decoding data memory 52 (see FIG. 5), each line image data is copied to image data of four identical super fine lines in the auxiliary scanning direction to prepare high-density image data of high resolution, and then stored in the first recording data memory 53 (S12). For example, as shown in FIG. 6, each of the A line image data, the B line image data, the C line image data, the D line image data, the E line image data, . . . is copied to line image data of four identical super fine lines in the auxiliary scanning direction. That is, the A line image data is copied to A1 to A4 line image data, the B line image data is copied to B1 to B4 line image data, . . . , the E line image data is copied to E1 to E4 line image data and so on, respectively, thereby preparing the high-density image data of high resolution. The copied high-density data is then stored into the first recording data memory 53.

Figure 7:
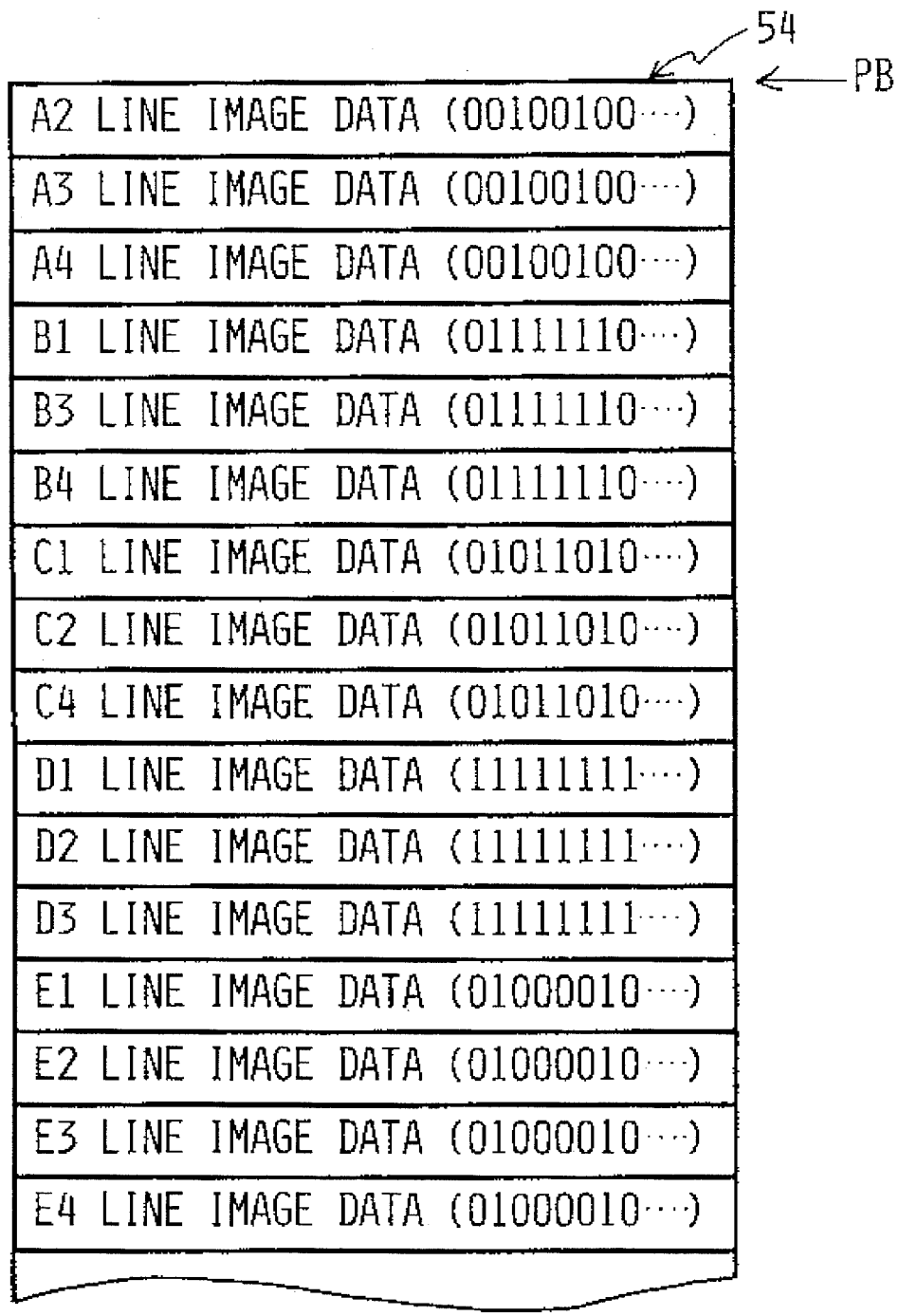
FIG. 7 is a schematic view of reduced image data which has been subjected to thin-out processing in the auxiliary scanning direction and stored in a second recording data memory.

Subsequently, a variable I, required for the thin-out processing, is set to the variable b of the denominator of the reduction ratio (S13) and the top addresses in the first and second recording data memories 53 and 54 are set to pointers PA and PB respectively at steps S13 and S14 (see FIGS. 6 and 7). Next, the variable I required for the thin-out processing is set to a value obtained by subtracting the numerator a of the reduction ratio from the variable I (S15). When the variable I is a positive value (S16:Yes), the pointer value PA is incremented by "1" (S17), and it is judged on the basis of the pointer PA whether any line image data exists in the first recording data memory 53 (S18). If the judgment at the step S18 is "YES", the program returns to the step S15.

On the other hand, if the variable I is a negative value below "0" or equal to "0" (S16: No), the line image data of the first recording data memory 53 indicated by the pointer PA is stored to the address of the second recording data memory 54 which is indicated by the pointer PB (S19). Subsequently, both of the values of pointer PA and the pointer PB are respectively incremented by "1" (S20), and the variable I is increased by an amount equal to the variable b (S21), thereafter the program returns to step S15 through step S18. If no line image data to be subjected to the reduction processing exists in the first recording data memory 53 (S18: No), the control is terminated and the program returns to the main routine.

That is, if the variable I is a positive value (S16: Yes), the pointer PA is incremented by "1" (S17) and the thin-out processing of the line image data is conducted because the line image data of the first recording data memory 53 which is skipped due to the increment of the pointer PA is not stored in the second recording data memory 54.

Thereafter, the reduced image data which has been subjected to the thin-out processing in the auxiliary scanning direction in the second recording data memory 54 is also subjected to another thin-out processing by thinning out the dot data in the main scanning direction in accordance with the reduction ratio by the gate array 31. The reduced image data which has been finally reduced in the auxiliary scanning direction and the main scanning direction are supplied through the P/S converter 28 to the thermal head 22 and, in response to the drive signal from the strobe signal generating circuit 29, the drive circuit 30 drives the heating elements to record on the recording sheet P an image which is reduced in accordance with the set reduction ratio.

For example, when the reduction ratio is 80%, the variables a and b are set to "4" and "5", respectively. Accordingly, to obtain the high-density image data of the first recording data memory 53 as shown in FIG. 7, "5" is first set to the variable I (S13), and then (5−4)=1 is set to the variable I (S15). Since the variable I is a positive value (S16:Yes), the pointer PA is incremented by "1", and the thin-out processing is conducted on "A1 line image data" of the first recording data memory 53 as indicated by the pointer PA.

Subsequently, (1−4)=−3 is set to the variable I at step S15, and "A2 line image data" indicated by the pointer PA is stored in the second recording data memory 54 because the variable I is a negative value. Thereafter, (−3+5)=2 is set to the variable I at step S21, and the program returns to step S15. Subsequently, in the same manner as described above, those image data which are located at intervals of five line image data away from the head line image data "A1 line image data", that is, "B2 line image data", "C3 line image data", "D4 line image data", . . . are successively subjected to the thin-out processing in the auxiliary scanning direction and, as shown in FIG. 7, the reduced image data which are reduced at the reduction ratio of 80% in the auxiliary scanning direction are stored in the second recording data memory 54. Thereafter, each line image data is subjected to the thin-out processing of plural dot data in the main scanning direction by the gate array 31 so as to be reduced at the reduction ratio of 80%. The gate array 31 removes every fifth dot in the main scanning direction and closes the dots to eliminate the gaps resulting from removing every fifth dot. Then the reduced image data which have been finally reduced in the auxiliary and main scanning directions at the reduction ratio of 80% are recorded on the recording sheet P by the thermal head 22.

As described above, the image data read from the reception data memory 51 are converted to high-density image data of a super fine line unit whose resolution is higher in the auxiliary scanning direction than the indicated standard mode, that is, whose line data number is four times as large as that of the received image data, and then subjected to the thin-out processing based on the reduction ratio in the auxiliary scanning direction. Therefore, the line data number to be subjected to the thin-out processing is increased, the weight of the one-line image data to the whole image data is decreased, and also the one-line image data to be thinned out are dispersed in the auxiliary scanning direction so that the reduced image data can be formed with an improvement in the image quality of the recorded image.

Figure 4:
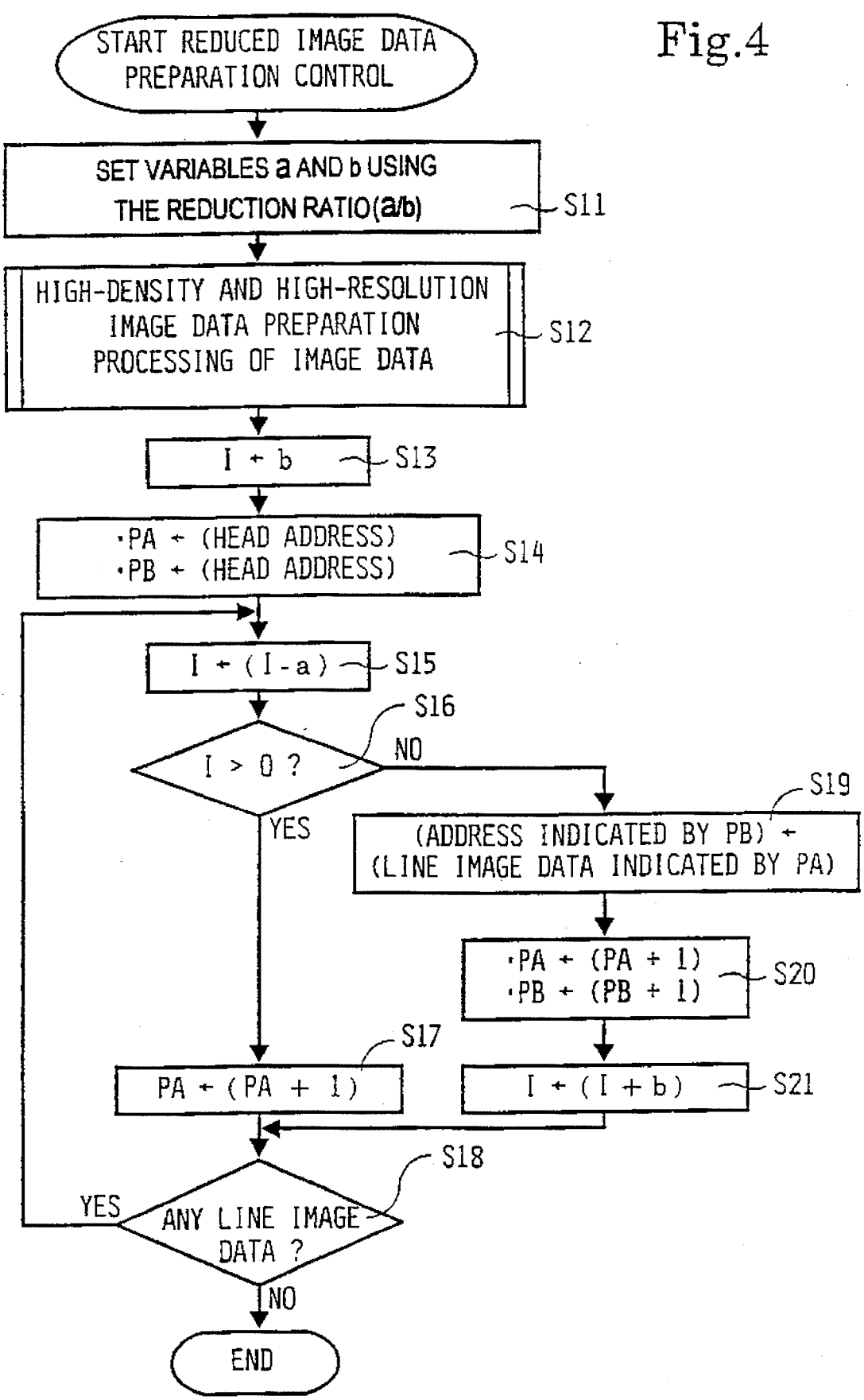
FIG. 4 is a flowchart showing a routine for a reduced image data preparation control.

In the above description, the reduction ratio setting means corresponds to the reduction ratio setting keys provided on the operation panel 3 and the reduced image data preparing means corresponds to the reduced image data preparation control as shown in FIG. 4.

At step S12 for the reduced image data preparation control, each line data of the received image data may be copied to image data of two super fine lines in the auxiliary scanning direction to prepare high-density image data of high resolution. The above-described reduced image data preparation control is applicable to the image data which is received at the resolution of the fine mode. Further, in the reduced image data preparation control, when the received data has the resolution of super fine mode, it may be directly subjected to the thin-out processing without being converted to the high-density image data of high resolution. Even when the image data read out by the read-out sensor 10 is subjected to a reduction copying operation, the reduced image data preparation control is applicable.

Various modifications may be made to the control of the embodiment on the basis of existing techniques or obvious techniques by persons skilled in the art without departing from the subject matter of this invention. Further, this invention is applicable to various types of facsimile machines having various recording devices such as a thermal sensitive type or a laser type.

As described above, according to the facsimile machine of the invention, the reduction ratio setting means and the reduced image data preparation means are provided, and the image data read from the storage means is converted to the high-density image data of higher resolution in the auxiliary direction than the indicated resolution, that is, the image data whose line data number is larger than that of the received image data, and then subjected to the thin-out processing based on the reduction ratio in the auxiliary scanning direction. Therefore, the number of line data to be thinned-out is increased so that the weight of the one-line image data to the whole image data is lowered, and the thinned-out line data are dispersed in the auxiliary scanning direction so that the reduced image data can be prepared with improved the image quality of the recorded image.

Further, the described capability can be resident in a transmitting facsimile. For example, when a transmitting facsimile has the ability to process large paper sheets, such as 11×17 inches, but the receiving facsimile can only print on smaller papers, such as 8½×11 inches, the exchange of protocols will so inform the transmitting facsimile. Based upon the size sheet which the receiving facsimile can print, the transmitting facsimile determines a reduction ratio and thins the data to be transmitted on that basis. Thus, the data received has been reduced prior to transmission and the receiving facsimile prints the data as received.

What is claimed:

1. A facsimile machine, comprising:

reception means for receiving image data transmitted from an external source;

read-out means for reading an original image source as image data;

storage means for storing image data supplied from at least one of said reception means and said read-out means;

record means for recording image data on a recording sheet;

reduction ratio setting means for setting a reduction ratio;

reduced image data preparing means for converting the image data read out from the storage means to high-density image data which has a higher resolution in the auxiliary scanning direction than a resolution with which the image data is stored in the storage means and for conducting a thin-out processing in the auxiliary scanning direction on the high-density image data on the basis of the reduction ratio set by the reduction ratio setting means to prepare reduced image data; and reduced image data output means for outputting the reduced image data prepared by the reduced image data preparing means to the record means for recording the reduced image data, wherein the resolution of the high-density image data is the same as the recording image data.

2. The facsimile machine as claimed in claim 1, wherein the reduced image data output means includes a transmitting means for transmitting a reduced image data to a receiving facsimile machine and the reduction ratio setting means includes means for setting the reduction ratio based upon protocols exchanged between the facsimile machine and the receiving facsimile machine when the transmitting means transmits the reduced image data.

3. The facsimile machine is claimed in claim 1, wherein the record means includes a line recording head extending in the main scanning direction perpendicular to the auxiliary direction and having a recording length which is same as that of recording sheet in the main scanning direction.

4. The facsimile machine as claimed in claim 3, wherein the reduced image data preparing means includes means for conducting a thin-out processing in the main scanning direction on the high-density image data on a basis of the reduction ratio.

5. A method for reducing image data in the recording sheet feed direction of a facsimile machine, comprising the steps of:

setting a reduction ratio;

determining a numerator and a denominator of the reduction ratio;

receiving image data;

storing the image data in a reception data memory;

converting the image data to high-density image data in an auxiliary scanning direction;

storing the high-density image data in a first recording data memory;

thinning out the high-density image data by reducing the number of lines of the high-density image data based upon the reduction ratio; and outputting the thinned-out high-density image data, wherein a resolution of the high-density image data converted by the converting step is the same as the output high-density image data outputted by the outputting step.

6. The method as claimed in claim 5, wherein the converting step comprises copying each line of image data into a space existing between the copied line and an adjacent line.

7. The method as claimed in claim 6, further comprises the step of storing the thinned-out high-density image data in a second recording data memory.

8. The method as claimed in claim 5, wherein the reduction ratio is set by an operator.

9. The method as claimed in claim 5, wherein the step of outputting includes transmitting the thinned-out high-density image data to a receiving facsimile machine and the reduction ratio is set by the facsimile machine based upon protocols exchanged between the facsimile machine and the receiving facsimile machine.

10. The method as claimed in claim 7, wherein the step of thinning out comprises the steps of:

setting a first pointer to an address for reading a first line image data in the first recording data memory;

setting a second pointer to an address for writing a first line of reduced image data in the second recording data memory;

setting a control variable equal to the denominator of the reduction ratio; and executing a thinning out cycle until all line image data in the first recording data memory have been processed.

11. The method as claimed in claim 10, wherein the step of executing the thinning out cycle comprises the steps of:

resetting the control variable to a value equal to the control variable minus the numerator of the reduction ratio; and determining whether the control variable is greater than zero.

12. The method as claimed in claim 11, wherein when the control variable is greater than zero, further comprises the steps of:

resetting the first pointer to an address for reading a next line image data in the first recording data memory;

determining if further line image data exists at the address identified by the first pointer in the first recording data memory; and, when it is determined that further line image data exists, returning to said resetting the control variable step.

13. The method as claimed in claim 11, wherein when the control variable is less than or equal to zero, further comprises the steps of:

moving the line image data indicated by the first pointer to an address identified by the second pointer in the second recording data memory;

resetting the first pointer to an address for reading a next line image data in the first recording data memory;

resetting the second pointer to an address for writing a next line of reduced image data in the second recording data memory;

reestablishing the control variable to be equal to the control variable plus the denominator of the reduction ratio;

determining if further line image data exists at the address identified by the first pointer in the first recording data memory; and, when it is determined that further line image data exists, returning to said resetting the control variable step.

14. An apparatus for reducing image data in the recording sheet feed direction of a facsimile machine, comprising:

means for setting a reduction ratio;

means for determining a numerator and a denominator of the reduction ratio;

means for storing the image data in a reception data memory;

means for converting the image data to high-density image data in an auxiliary scanning direction;

means for storing the high-density image data in a first recording data memory;

means for thinning out the high-density image data by reducing the number of lines of the high-density image data based upon the reduction ratio; and means for outputting the thinned-out high-density image data, wherein a resolution of the high-density image data converted by the converting means is the same as the output high-density image data outputted by the outputting means.

15. The apparatus as claimed in claim 14, wherein said means for converting comprises means for copying each line of image data into a space existing between the copied line and an adjacent line.

16. The apparatus as claimed in claim 15, further comprises means for storing the thinned-out high-density image data in a second recording data memory.

17. The apparatus as claimed in claim 14, wherein said means for setting the reduction ratio is used by an operator.

18. The apparatus as claimed in claim 14, wherein said means for outputting includes means for transmitting the thinned-out high-density image data to a receiving facsimile machine and said means for setting the reduction ratio sets the reduction ratio based upon protocols exchanged by the facsimile machine and the receiving facsimile machine.

19. The method as claimed in claim 16, wherein the means for thinning out comprises:

means for setting a first pointer to an address for reading a first line image data in the first recording data memory;

means for setting a second pointer to an address for writing a first line of reduced image data in the second recording data memory;

means for setting a control variable equal to the denominator of the reduction ratio; and means for executing a thinning out cycle until all line image data in the first recording data memory have been processed.

20. The apparatus as claimed in claim 19, wherein the means for executing the thinning out cycle comprises:

means for resetting the control variable to a value equal to the control variable minus the numerator of the reduction ratio; and means for determining whether the control variable is greater than zero.

21. The apparatus as claimed in claim 20, wherein when the control variable is greater than zero, further comprises:

means for resetting the first pointer to an address for reading a next line image data in the first recording data memory;

means for determining if further line image data exists at the address identified by the first pointer in the first recording data memory; and, when said means for determining determines that further line image data exists;

means for returning to execution of said means for resetting the control variable.

22. The apparatus as claimed in claim 20, wherein when the control variable is less than or equal to zero, further comprises:

means for moving the line image data indicated by the first pointer to an address identified by the second pointer in the second recording data memory;

means for resetting the first pointer to an address for reading a next line image data in the first recording data memory;

means for resetting the second pointer to an address for writing a next line of reduced image data in the second recording data memory;

means for reestablishing the control variable to be equal to the control variable plus the denominator of the reduction ratio;

means for determining if further line image data exists at the address identified by the first pointer in the first recording data memory; and, when said means for determining determines that further line image data exists, means for returning to execution of said means for resetting the control variable.

* * * * *